Sept. 5, 1950  L. B. LYNN ET AL  2,520,944
HYDRAULIC APPARATUS, PARTICULARLY FOR
VEHICLE STABILIZING EQUIPMENT
Filed Nov. 20, 1947  4 Sheets-Sheet 1

WITNESSES:  
E. A. McCloskey  
Thw. Le Goone

INVENTORS  
Lawrence B. Lynn and  
Stanley J. Mikina.  
BY Paul E. Friedemann  
ATTORNEY

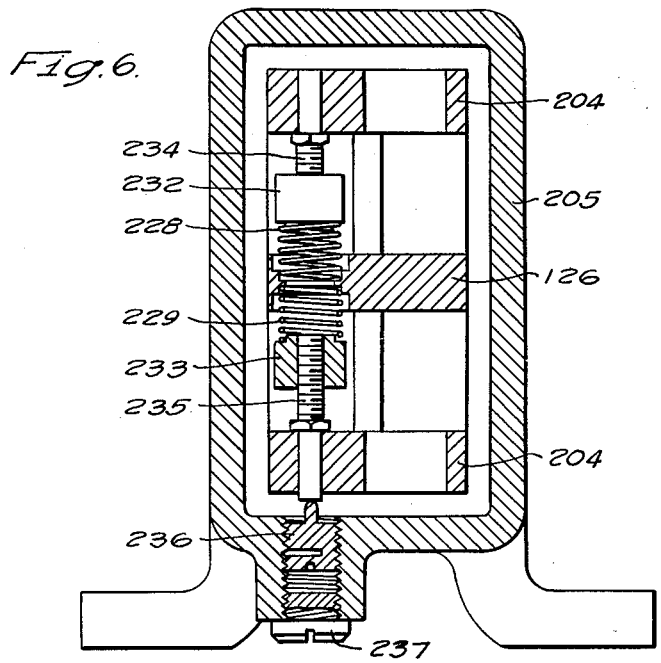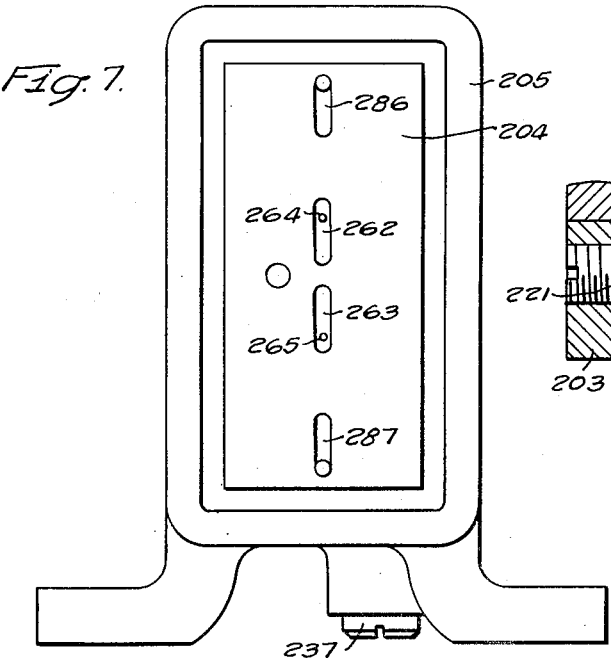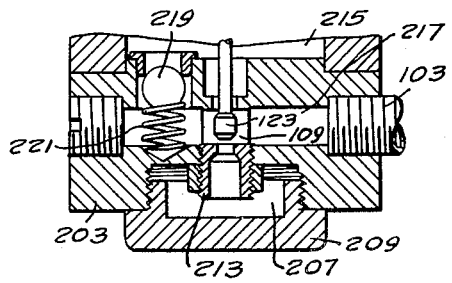

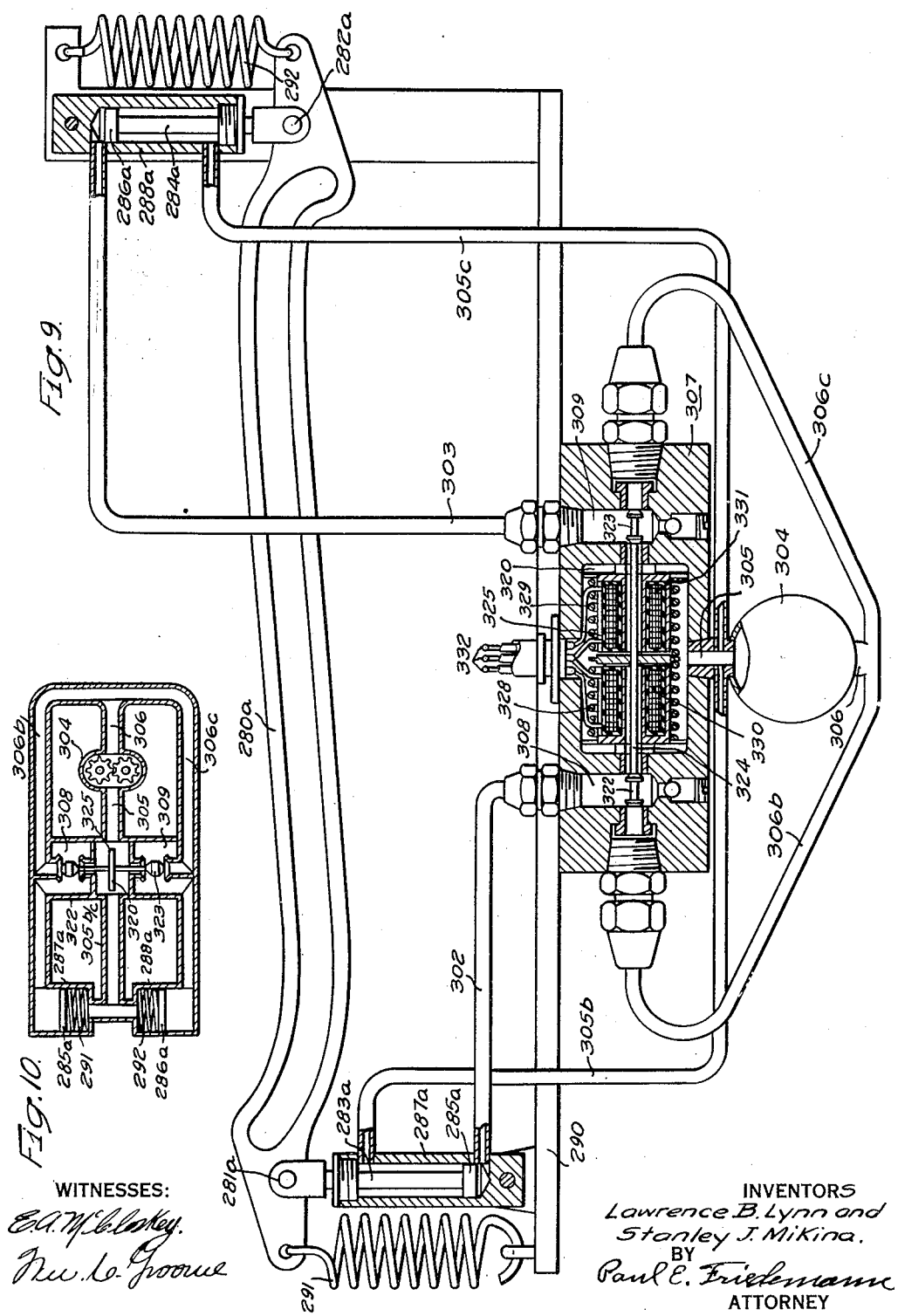

Patented Sept. 5, 1950

2,520,944

UNITED STATES PATENT OFFICE 2,520,944

HYDRAULIC APPARATUS, PARTICULARLY FOR VEHICLE STABILIZING EQUIPMENT

Lawrence B. Lynn, Wilkinsburg, and Stanley J. Mikina, Pittsburgh, Pa., assignors to Westinghouse Electric Corporation, East Pittsburgh, Pa., a corporation of Pennsylvania Application November 20, 1947, Serial No. 787,230

16 Claims. (Cl. 60—52)

Our invention relates to hydraulic apparatus and, more particularly, to complete hydraulic systems as well as to valve devices for controlling the performance of such systems. In one of its specific aspects the invention relates to hydraulic apparatus for stabilizing purposes, for instance, to ride stabilizers for vehicles.

The invention involves improvements over hydraulic systems and hydraulic control devices of the kind disclosed in the copending applications Serial No. 509,314 of C. R. Hanna, Serial No. 623,368 of L. B. Lynn and C. R. Hanna, and Serial No. 794,145 of L. B. Lynn, all assigned to the assignee of the present invention. Application Serial No. 509,314 issued on Jan. 3, 1950 as Patent No. 2,492,990.

It is an object of our invention to devise hydraulic apparatus that, in comparison with apparatus previously disclosed, permits selecting the inherent amplification factor within a much wider range, and permits obtaining a much larger amplification than heretofore possible. It is also an object of the invention to afford reducing the idling losses of the system for a given amplification factor. A further object is to permit employing a condition responsive pilot mechanism of lower time constant than previously applicable.

Another object of our invention is to provide hydraulic apparatus capable of a controlled performance similar to that of the systems previously disclosed while requiring as a power source only one pump instead of the two pumps heretofore necessary in the older systems.

According to one feature of the invention, we connect a variable-volume space of a hydraulic device to be controlled to one of three openings in a cavity of a device whose other two openings are in communication with the pressure and return ducts respectively of a pump or other source of a flow of liquid under pressure, and we provide the control device with two interconnected valve members which vary the flow area or flow resistance values of the two latter openings in inverse relation to each other through a range of continuous variation between finite magnitudes.

According to another feature of the invention, we employ a hydraulic motor or other device which has a pair of pressure ducts and is controlled by the difference in the hydraulic pressures applied to the respective ducts, and we connect this device to the duct pair of the hydraulic power source through a control device which has two cavities in free communication with the respective ducts of one duct pair, each cavity having two flow-restricting openings in always open communication with the respective ducts of the other duct pair so that the two cavities form hydraulically parallel arranged paths for the flow of liquid from one to the other duct of the other duct pair; and we provide the control device with interconnected valve structures which control the flow of liquid through said respective paths in inverse relation to each other. According to a more specific feature of our invention, we provide each cavity with two valve elements for controlling the above-mentioned two openings respectively, so that the control device includes a compound valve mechanism with four interconnected valve elements which are open during all phases of normal operation but vary their respective flow areas or flow resistances in the above-mentioned relation to one another when actuated.

These and other objects and features of the invention will be apparent from the following description in conjunction with the drawings, in which:

Figs. 4 to 8 illustrate details of a control device for ride stabilizers, according to Figs. 2 and 3; more specifically: Figs. 4 and 5 show two respective cross sections of the device taken at a right angle to each other;

Fig. 6 shows another section taken along a plane denoted in Fig. 5 by the section line VI—VI;

Fig. 7 shows part of the device in a view taken from the right of Fig. 5 onto the sectional plane denoted by line VII—VII in Fig. 5;

Fig. 8 shows a cross section through a detail of the device appearing in the lower right corner of Fig. 5, the section plane of Fig. 8 extending at a right angle to the plane of illustration of Fig. 5;

Fig. 9 is a part-sectional illustration of another modification of apparatus according to the invention designed for adjusting a cam member of the fabricating machinery; and Fig. 10 is an explanatory hydraulic circuit diagram of the apparatus according to Fig. 9.

Figure 1:
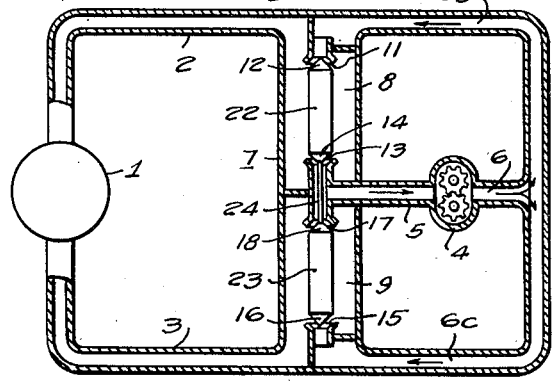
Figure 1 is the hydraulic circuit diagram of apparatus according to the invention shown, simplified and schematically, for the purpose of explanation.

In Fig. 1 the hydraulic device to be controlled is schematically represented as a motor 1 with two pressure ducts or conduits 2 and 3 which lead into respective pressure spaces of motor 1. The operation motor 1 is controlled by the difference in the pressures of the two ducts. The pressure for operating the motor is provided by a suitable pressure source, such as a positive displacement pump 4 with a pair of ducts 5, 6 for circulating liquid under pressure. The pump may operate at constant speed for constant volumetric delivery. In the diagram of Fig. 1, duct 6 is assumed to represent the pressure or outlet duct, while duct 5 is the neutral or the return duct. Duct 6 branches into two conduits 6b and 6c. Interposed between the pressure source 4 and the motor 1 is a control device denoted as a whole by 7. This device has two chambers 8 and 9 each of which has an opening in communication with the motor duct 2 or 3. Since the chambers 8 and 9 are preferably designed as cavities in the housing structure of the control device, they are hereinafter referred to as "cavities," although it should be understood that the particular design, arrangement and size of these spaces is not essential as regards the basic features and performance of apparatus according to the invention.

Cavity 8 has a valve opening 11 controlled by a movable valve element 12 and in communication with the pump conduit 6b. Another valve opening 13 of cavity 8 is controlled by a movable element 14 and communicates with the return conduit 5 of the pump. Similarly, the cavity 9 has a valve opening 15 controlled by a movable valve element 16 and in communication with the pump conduit 6c, and another opening 17 controlled by a movable valve element 18 and in communication with the return duct 5. The valve elements 12 and 14 are formed by valve faces of a body 22, and the valve elements 16 and 18 consist of valve faces on another valve body 23. Bodies 22 and 23 are interconnected by a rod 24. Any movement of rod 24 is imparted to both valve bodies so that the flow areas of the four valves are simultaneously varied in a fixed relation to one another. In any valve position, the flow area at opening 11 is preferably equal to that at opening 17, and the flow area at valve opening 13 is preferably equal to that at opening 15. The amplification factor of the control apparatus depends upon the difference between the flow area ($A_1$) at valve opening 11 or 15 and the flow area ($A_2$) at opening 13 or 17, and is a maximum when both areas are equal, as will be set forth in a later place.

Assuming that the flow of liquid impelled by the pump 4 is in the direction of the arrows, a continuous circulation occurs from conduit 6b through cavity 8 to duct 5, and another continuous circulation exists from conduit 6c through cavity 9 to duct 5. Consequently, the two cavities 8 and 9 are arranged in hydraulic parallel relation to each other between the two ducts 5 and 6 of the hydraulic power source.

When the valve bodies 22 and 23 are in the illustrated normal position, the flow area or resistance to fluid flow at opening 11 is equal to the corresponding magnitude at opening 15, and the flow area or resistance at valve opening 13 is equal to that at valve opening 17. Under these conditions, the magnitudes of fluid flow in the two cavities are the same and the pressures built up in the two cavities and applied to the respective ducts of the motor 1 are also the same. Consequently, the differential pressure on the motor is zero and the motor remains at rest. When the valve structure, by some control element not illustrated in Fig. 1, is moved upwardly, the flow areas at valve openings 11 and 17 are reduced and the corresponding areas at valve openings 13 and 15 are increased. As a result, the pressure in cavity 8 decreases, while the pressure in cavity 9 increases. Accordingly, the motor duct 3 assumes high pressure and the duct 2 low pressure, so that the motor is actuated in the corresponding direction of movement. When the valve structure is moved downwardly from the illustrated position, the valves change their flow areas and flow resistances in the opposite sense so that the pressure in cavity 8 is increased and the pressure in cavity 9 decreased. The corresponding pressure difference acting on the motor 1 then causes the motor to produce movement in the opposite direction.

Since each of the four individual valves when changing its flow area has a pressure controlling effect on the differential pressure applied to the motor, it will be recognized that a compound valve with four individual valve units, properly correlated as explained above, has a correspondingly multiplied control effect.

Some modifications of the hydraulic circuit which do not affect its principle of operation will be apparent. For instance, if the polarity of the hydraulic power source is reversed, that is, if the pump 4 is operated in the reverse direction so that duct 5 represents the outlet and duct 6 the inlet, the above-described operation remains substantially the same except that the pressures in cavities 8 and 9 and the direction of movement in motor 1 are reversed. Another modification consists in an exchange of power source and motor. That is, the motor may be connected at the illustrated place of the pump, while the pump is placed at the illustrated location of the motor. As will be understood from the diagram of Fig. 10 explained below, it is also possible to connect the two pressure conduits 2 and 3 to two individual motors so that the control of each motor is effected by only one valve body with two individual valve elements disposed in a single cavity.

Figure 2:
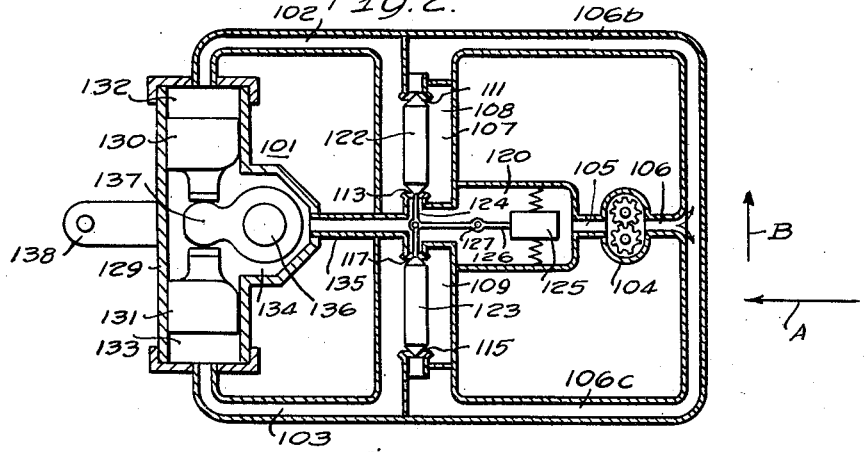
Fig. 2 is a modified form of apparatus according to the invention especially designed as a ride stabilizer for vehicles and represented diagrammatically in a manner similar to the showing of Figure 1.

The hydraulic apparatus diagrammatically represented in Fig. 2 is especially designed for the control of stabilizing equipment, in particular for stabilizing the spring suspended body of a vehicle.

The device to be controlled is denoted as a whole by 101. It consists of a cylinder-and-piston device of a design similar to customary hydraulic shock absorbers. The device is controlled by the difference in the pressures applied to a pair of ducts or conduits 102, 103. The necessary liquid under pressure is provided by a positive displacement pump 104 which has a return duct 105 and a pressure duct 106. The pressure duct 106 is split into two branch conduits 106b and 106c. Disposed between pump and controlled device 101 is a pilot apparatus 107 whose housing structure has two cavities 108 and 109. Cavity 108 has two valve openings 111 and 113 in communication with the respective pump ducts 106b and 105 and controlled by two valve faces of a valve body 122. Cavity 109 has two valve openings 115 and 117 in communication with conduits 106c and 105, respectively, and controlled by valve faces of a valve body 123. The bodies 122 and 123 are interconnected by a rod 124. The control device 107 encloses a neutral pressure space 120 which is in free communication with the return conduit 105 and with the valve openings 113 and 117. An inertia weight 125 is removably suspended within the neutral pressure space 120. Weight 125 is mounted on an arm 126 which is pivoted about a shaft 127 and linked to the connecting rod 124. The weight 125 is normally held in center position by means of biasing springs.

The controlled stabilizing device 101 has a cylinder 129 with two pistons 130 and 131 which form, together with the cylinder, two pressure spaces 132 and 133, respectively, and in intermediate neutral space 134. The neutral space is connected by a conduit 135 with the neutral space 120 of the control device 107 and with the return conduit 105 of the pump. The neutral space 134 of the stabilizer 101 is traversed by a shaft 136 which carries a ball-shaped transmitting member 137. Member 137 is engaged by the two pistons 130 and 131. An arm 138 is mounted on shaft 136 outside of device 101.

For the purpose of explanation, it may be assumed that the entire hydraulic system of Fig. 2 is mounted on the spring supported body of a vehicle so that the plane of illustration represents a horizontal plane of the vehicle body, the traveling direction of the vehicle being indicated by the arrow A. It may further be assumed that the apparatus serves for stabilizing horizontal oscillations of the vehicle body transverse to the direction of travel. The peripheral end of arm 138 is linked to the unsprung journal or truck structure of the vehicle as will be explained more in detail when referring to Fig. 3.

As the vehicle is traveling in the direction of arrow A, a transverse movement of the vehicle body, for instance, in the direction indicated by the arrow B has the effect of producing relative movement between the inertia weight 125 and the enclosing and supporting structure of the control device. That is, due to its inertia, the weight 125 lags behind the movement of the vehicle body and moves downward relative to the illustration in Fig. 2. Thus the valve structure is shifted in the upward direction so that the flow areas of valve openings 111 and 117 are diminished and those of valve openings 113 and 115 are increased. As a result, the pressure in cavity 108, duct 102 and pressure space 132 is reduced, and the pressure in cavity 109, duct 103 and pressure space 133 is increased. The previously balanced piston assembly of the device 101 is shifted in the upward direction so that arm 138 is turned clockwise, i. e., also in the upward direction.

When the oscillation of the vehicle body to be stabilized is in opposition to the arrow B, the just-mentioned pressure control is reversed so that the arm 138 turns counterclockwise. In summary, in the system according to Fig. 2, a movement to be stabilized has the effect of producing a movement in the same direction of the free end of arm 138.

Figure 3:
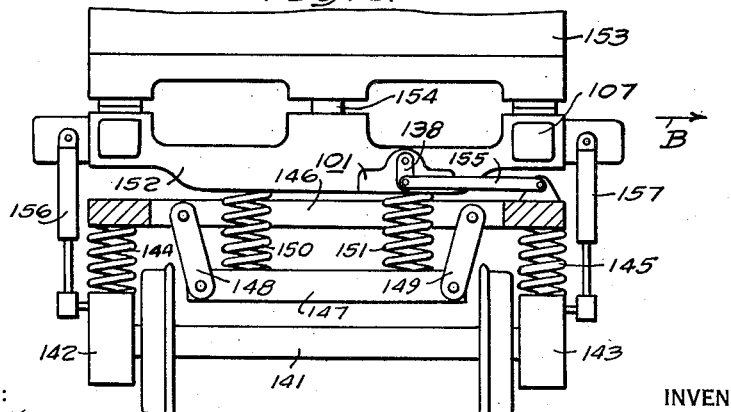
Fig. 3 shows schematically a vehicle equipped with ride stabilizing apparatus according to Fig. 2.

Referring now to Fig. 3, it will be explained how such movement of arm 138 is used for counteracting and stabilizing the undesired oscillation.

In Fig. 3, the wheel and axle structure of a rail vehicle is denoted by 141. The axle structure is journalled in journal boxes 142 and 143 which form part of a structure on which vehicle springs 144 and 145 are supported. A truck frame 146 rests on springs 144 and 145. A spring plank 147 is movably suspended from the truck frame 146 by means of swing links 148 and 149 and serves as a support for another set of springs 150 and 151. A bolster 152 is supported by springs 150 and 151 and serves to support the vehicle body proper, denoted by 153. A swivel bearing 154 between bolter 152 and body 153 permits annular movement of the body relative to bolster and truck. The spring suspension elements of the truck permit vertical oscillations of the unsprung wheel-and-axle structure relative to the car body and prevent the body from being unduly affected by road shocks. The swing suspension also permits relative movements between the unsprung wheel- and-axle structure and the car body in the horizontal direction transverse to the direction of travel as indicated, for instance, by the arrow B. As mentioned above, the system according to Fig. 2 may be used for stabilizing such horizontal oscillations. To this end, the control device 101 is mounted on the bolster 152 and its arm 138 is connected by a rigid link 155 with the truck frame 146. When the bolster 152 and the vehicle body 153 move in the direction of the arrow B (Fig. 3), such movement, if unopposed, would cause the link 155 to push against the arm 138 in the direction opposite to that of the arrow B. As explained, however, the inertia-controlled stabilizing device 101 imposes on the arm a force causing its peripheral end to move in the same direction as the arrow B. Consequently, the original tendency to move is immediately counter-acted and substantially eliminated. As a matter of fact, the system is capable of sensing any tendency of the vehicle body to move horizontally transverse to the direction of travel and imposes on the stabilizing elements the forces necessary to prevent an appreciable deflection.

Fig. 3 shows also two stabilizing cylinder-and-piston devices 156 and 157 linked between the bolster 152 and the journal structures 142 and 143, respectively. These stabilizing devices may also be controlled by a hydraulic system according to the present invention to stabilize the vehicle body relative to vertical oscillations. The inertia weight of such a system must be arranged so that it responds to vertical movements of the control device.

Before describing further details, a comparison of the above-described system of Fig. 2 with the system previously disclosed in the above-mentioned application Serial No. 509,314 will be given in order to elucidate some performance characteristics and advantages of the invention.

The force amplification between main control valves and controlled device in hydraulic apparatus of the type here dealt with is the ratio of the output force developed by the piston of the controlled device (shock absorber piston) to the pilot force required for moving the main valves. In the previously disclosed system (Serial No. 509,314, Fig. 3), these forces are proportional, respectively, to the area ($A_p$) of the shock absorber piston and the area ($A_v$) of main valve so that the amplification (R) is $$R = \frac{A_p}{A_v}$$

In a hydraulic system according to the present invention (Figs. 1 and 2), the amplification factor (R) is also the ratio of output force to the pilot force, but these forces are proportional to the area $A_p$ of the piston (for instance, 130 in Fig. 2) to the difference in the areas $A_1$ and $A_2$ the two associated valve openings (for instance, at 111 and 113 in Fig. 2):

$$R = \frac{A_p}{A_1 - A_2}$$

Consequently, by properly selecting the area difference of valve openings 111 and 113 (or 117 and 115) the amplification in apparatus according to the invention can be rated within wide limits in accordance with any desired magnitude, and the amplification factor can be given an extremely high value by making the valve area $A_2$ (at 113 or 117) nearly equal to the area $A_1$ (at 111 or 115). The amplification factor can even be made negative if desired.

In further contrast to the systems previously disclosed, the idling losses (determined by the average pressure drop at the valves times the pump volume rate) can be reduced because the average pressure drop at the valves can be made as low as required by virtue of the fact that the individual valve area is no longer limited by the required amplification factor.

The overall time constant in the previously disclosed systems, as well as in systems according to the invention, is that of the pilot actuation; but the invention permits lowering this time constant because for a given amplification factor both the valve travel and force can be lowered permitting the design of a faster acting pilot mechanism.

These advantages are made possible without incurring a reduction in the working efficiency of the system (ratio of volume rate of liquid entering the controlled device to volume rate of liquid entering the pump) which is not affected by the change in valve design and valve performance.

An embodiment of the inertia responsive control device (pilot apparatus) 107 will now be described in detail with reference to Figs. 4 to 8. In order to facilitate comparing these figures with the diagram of Fig. 2, those elements shown in Figs. 4 and 8 that correspond to elements of the control device 107 according to Fig. 2 are denoted by the same respective reference numerals as those used in Fig. 2, and the ducts or conduits denoted in Fig. 2 by 102, 103, 105, 106b, 106c and 117 are designated by the same respective numerals in Figs. 4 to 8.

The pilot apparatus according to Figs. 4 to 8 contains a number of ducts, passages, cavities and other enclosed chambers or spaces which are formed by five bodies 201, 202, 203, 204, 205. These bodies are firmly and tightly attached to each other and form together a rigid housing and a support for a number of elements described hereinafter.

Bodies 202 and 203 have an entrance chamber 206 or 207 (Fig. 5) closed by a cover screw 208 or 209. Each entrance chamber has a threaded opening at which the pump outlet conduit 106b or 106c is attached. Sleeves 212 and 213 are inserted in bodies 202 and 203, respectively, and have each a cavity 108 or 109. Cavity 108 communicates through a valve opening with the entrance chamber 206 and hence with the conduit 106b (Fig. 5). Cavity 109 communicates through a valve opening with the chamber 207 and hence with the conduit 106c which leads to the same pump outlet duct as the conduit 106b. Sleeve 212 has another (lower) valve opening through which the cavity 108 (Fig. 5) communicates with an intermediate pressure chamber 214 which, in turn, communicates with the neutral pressure space 120 within body 205 in a manner to be described in a later place; and cavity 109 (Figs. 5, 8) has another (upper) valve opening in communication with another intermediate pressure chamber 215 also in hydraulic connection with the neutral pressure space 120. Two valve bodies 122 and 123 (Figs. 5, 8) are movable in the respective cavities. Each of bodies 122 and 123 has two valve faces to cooperate with the respective two valve openings of each cavity (as explained above with reference to Fig. 2).

Across bore 217 in body 203 (Fig. 8) is in free communication with cavity 109 and is plugged at one end. The other end of bore 217, selected for most convenient installation, receives the end of conduit 103 leading to the controlled device 101 (see Fig. 2). An opening is provided between cross bore 217 and intermediate pressure chamber 215. This opening is controlled by a check valve comprising a valve ball 219 and a spring 221 (Fig. 8). Due to the spring bias and under the pressure obtaining in cross bore 217 and cavity 109, the check valve remains closed during normal operation. It opens only when, due to abnormal pressure conditions, the pressure in chamber 215 becomes temporarily higher than that in the cavity 109. The detail design of body 202 (Fig. 5) is similar to the features of body 203 shown in Fig. 8, except that the cavity 108 in body 202 is in free communication with the conduit 102 of the controlled device.

The neutral space 120 within body 205 (Fig. 4) is in free communication with a group of interconnected bores 222 of body 201. These bores have three threaded openings toward the exterior. One opening is plugged. The two others, selected for convenient installation, receive respectively the pump inlet conduit 105 and the neutral conduit 135 leading to the neutral space 134 of the controlled device (Fig. 2).

The two intermediate pressure chambers 214 and 215 (Fig. 5) communicate with each other through bores 223, 224, 225 (Figs. 4, 5) of body 201. Bore 225 communicates with bores 222 (Fig. 4) under control by a spring biased pressure-control valve 226 adjustable by means of a screw 227. Valve 226 checks the flow of liquid from bores 222 to the intermediate pressure chambers 214, 215 but permits a flow in the reverse direction if the pressure in the intermediate chambers exceeds an adjusted value. Hence, the setting of valve 226 determines the pressure difference maintained between the intermediate chambers 214, 215 and the neutral space 120.

The inertia weight 125 is mounted on an arm 126 whose pivot shaft 127 is journalled in ball bearings mounted on body 204 (Figs. 4, 5). The centering springs 228 and 229 for weight 125 rest against abutments 232 and 233, respectively, which are in threaded engagement with respective screws 234 and 235 mounted on body 204. The abutments are set for adjusting and roughly balancing the centering force of springs 228 and 229. A correct balance is secured by shifting the screw 235 with the aid of a calibrating screw 236 threaded into a bore of body 205 and accessible from the outside after removal of a cover screw 237 (Fig. 6). Excessive movements of the inertia weight 125 are prevented by abutment pins 238 and 239 screwed into the body 204 (Fig. 5).

The valve bodies 122 and 123 are mounted on rods 242 and 243, respectively (Fig. 5). The rods are attached to respective piston structures 244 and 245 which are movable in cylinders 246 and 247 and have cup-shaped packings 248 and 249, respectively. The two piston structures are interconnected by struts 251, 252, 253 (Figs. 4, 5) which pass through the respective bores 223, 224 and 225. Consequently, the two valve bodies 122 and 123 form part of a rigid valve structure and move in unison in the same manner as explained above with reference to Figs. 1 and 2.

The just-mentioned cylinder-and-piston devices disposed in the intermediate pressure chambers 214 and 215 represent variable-volume containers for actuating the valve structure. Each of cylinders 246 and 247 communicates through an orifice 256 or 257 with the intermediate pressure chamber 214 or 215 and has an outlet passage in communication with a duct 258 or 259 of body 201 (Fig. 5). Ducts 258 and 259 open into cavities 262 and 263, respectively (Figs. 5, 7), which are connected with the neutral space 120 through respective orifices 264 and 265. The flow areas of these orifices are controlled by poppet valves (pilot valves) 266 and 267 (Fig. 5). The two pilot valves are controlled in inverse relation to each other by a teeter bar 268 actuated by the inertia weight 125. When the inertia weight is in the illustrated center position, the flow areas of both pilot valves are equal. Then, the pressure obtaining between the orifices 256 and 264, i. e., within cylinder 246, is equal to the pressure obtaining between the orifices 257 and 265, i. e., within cylinder 247. Consequently, the force imposed by the pistons 244 and 245 on the valve structure are balanced, and the valve structure is normally in the illustrated centered position. When the inertia weight deflects from the center position, one pilot valve reduces its flow area and the other increases its flow area. The pressures in the cylinders 246 and 247 become different from each other so that one piston moves inwardly and the other, outwardly of the appertaining cylinder. As a result, the valve assembly moves one or the other way depending upon the direction of weight deflection. The hydraulic transmission between inertia weight and the compound main valves represents a power multiplying or amplifying system. That is, small variations in force or displacement imposed on the pilot valves cause proportionate variations of amplified forces or displacements to occur at the main valves. Hence, the device according to Figs. 4 to 8 provides amplification in addition to that inherent in the hydraulic system of the main valves. It may be mentioned, however, that for many purposes, including the control of stabilizing equipment, the amplification obtainable by the main valve system is amply sufficient so that the inertia weight may be directly linked to the main valve structure thus permitting a considerable simplification of the device. Such a simplified control device, though equipped with condition-responsive control means other than an inertia weight, will be described below with reference to Fig. 9.

For inertia controlled vehicle stabilizing equipment a control performance proportional to the velocity of the movements to be stabilized is usually desirable. Since the movements of an inertia weight relative to its support are proportional to acceleration if the weight is subjected to an elastic bias only, damping means are provided to receive the preferred velocity-proportional deflection. These damping means, as shown in Fig. 5, are disposed and designed in the following manner.

Body 204 has two coaxial bores 272 and 273 which form dashpot cylinders and are covered by respective plates 274 and 275. Each plate has an orifice 276 or 277. Pistons 278, 279 with cup-shaped packings are movable in the cylinders and are interconnected by a rod 280. Rod 280 passes through an opening in weight arm 126 (Figs. 4, 5) and is pivotally linked to arm 126 by a shaft 281. Rod 280 may consist of two separate pieces, each being attached at one end to the respective pistons 278 and 279 while the other ends of the rod pieces are pivoted on pin 281 which then forms a hinge between the two pieces. Cylinders 272 and 273 communicate through an orifice 282 or 283 and a duct 284 or 285 with a cavity 286 or 287 (Figs. 5, 7) which is hydraulically connected to the intermediate pressure chamber 214 or 215 (Fig. 5). Hence, there is a steady flow of liquid from chamber 214 through a bleeder passage 286—284—282—272—276 to the neutral pressure space 120. A similar bleeder passage 287—285—283—273—277 leads from intermediate pressure chamber 215 to neutral space 120. Any movement of weight 125 about its center position causes the damper pistons 278 and 279 to reduce the enclosed volume of one cylinder and to increase that of the other cylinder. The expanding cylinder space draws liquid through the orifices 276, 282 or 277, 283 and the compressed cylinder space expells liquid through the respective orifices so that the piston movements are damped. In one orifice of each cylinder the flow of liquid due to piston movement is in the direction of the steady flow from the intermediate pressure chamber to the neutral space and hence reduces the latter flow, while in the other orifice the two flow components are in opposition to each other, so that at this point the continuous flow from the intermediate chamber to the neutral space is increased. Under these conditions the damping effect is independent of changes in viscosity of the liquid and hence affords a substantially constant damping characteristic. For further elucidating this effect, it may be mentioned that the flow of oil through the orifices 276 and 277 never reverses in direction. On the expanding side, for example at orifice 276, the flow through the orifice is reduced and the pressure in cylinder space 272 is increased. At the same time, the flow through orifice 277 is increased and the pressure in cylinder space 273 is decreased. The difference in pressure is nearly proportional to the velocity of the pistons, and the resulting force is the damping force. The existence of a steady flow of liquid through the cylinder spaces has the further effect that the cylinders are automatically filled when the source of pressure liquid is put in operation, and that any initially enclosed air bubbles are scavenged out of the cylinder. Besides, by adjusting or selecting the flow resistance of the bleeder passages and orifices so that the average pressure in the cylinder is not higher than the mean value of the modulated pressure, the leakage losses and the friction at the cup-shaped packings can be kept at a minimum.

Due to the steady flow of liquid from the intermediate pressure chambers 214, 215 (Fig. 5) to the neutral space 120 through the bleeder passages of the actuating cylinders 246, 247, the latter cylinders are also scavenged by a steady flow of liquid and the force imparted to their respective pistons is proportional to the pressure variation or movement of the pilot valves. In order to reduce leakage losses and friction at the cup-type packings 248, 249, the average pressure within the actuating cylinders may also be adjusted to be not appreciably higher than the mean modulated pressure.

The above-mentioned design and pressure adjustment of the bleeder passages is in accordance with the copending application Serial No. 794,145 of L. B. Lynn, assigned to the assignee of the present invention, and it should be understood that other features disclosed in the copending application may also be applied in conjunction with apparatus according to the present invention.

The embodiment of the invention illustrated in Fig. 9 exemplifies an application for the control of fabricating machinery. More specifically, the illustrated apparatus represents the control portion of a shuttle drive for weaving looms. Such a shuttle drive is illustrated and described more in detail in the copending application Serial No. 788,346 of S. J. Mikina which issued June 21, 1949 as Patent No. 2,473,896. However, for a complete understanding of the controlling apparatus according to the present invention, it suffices to know that the element to be controlled by the hydraulic system consists of a slotted lever 280a which is hinged at two pivot pins 281a and 282a, and, in order to perform its controlling operation, is to be alternately tilted about the pivot pins 281a and 282a.

The pivot pin 281a is attached to a piston rod 283a, and pin 282a is attached to a similar rod 284a. The appertaining pistons 285a, 286a are slidable in a cylinder 287a or 288a. The two cylinders are attached to a stationary supporting structure or machine frame 290. Each pivot pin and appertaining piston assembly is biased toward the illustrated position of rest by a spring 291 or 292.

The two cylinder and piston devices form part of a hydraulic apparatus designed in accordance with the invention. This apparatus is schematically represented by the simplified circuit diagram illustrated in Fig. 10 which may also be referred to for an understanding of the following description.

The pressure space between the piston 285 and the bottom of cylinder 287a is in communication with a conduit 302. A similar conduit 303 leads to the pressure space between piston 286a and cylinder 288a. Liquid under pressure to be supplied to the conduits 302 and 303 is provided by a hydraulic power source 304 which may consist of a pump or of a pressure reservoir. The source 304 has an inlet or return duct 305 split into two conduits 305b and 305c and a pressure duct 306, the latter being split into two conduits 306b and 306c. A control device 307 has two cavities 308 and 309 and a neutral chamber 320. Each of these cavities has three openings. One opening is in communication with the conduit 302 or 303. The two other openings of each chamber communicate with the duct 306b or 306c and with the neutral chamber 320, respectively. Two valve bodies 322 and 323 in respective cavities 308 and 309 are each equipped with two valve elements for controlling the two latter openings of each cavity, as explained in the foregoing with reference to Figs. 1 and 2. The two valve bodies 322 and 323 are interconnected by a rod 324 which traverses the neutral chamber 320 and carries a magnetic armature 325 inside the chamber. Two helical springs 328 and 329 rest against the armature 325 and hold it normally in centered position. Two electromagnet coils 330 and 331 arranged in chamber 320 at both sides respectively of the armature 325 serve to displace the armature in opposition to the spring bias toward one or the other side, depending upon which of the two magnets is more strongly energized. Energizing current is supplied to the magnet coils from terminals 332 which are connected to a suitable electric control device (not illustrated) to be actuated by the fabricating machinery in a predetermined phase relation to the operating cycle of the machinery.

As long as the armature 325 is in the illustrated center position, the pressures in the two cavities 308 and 309 are equal. When the magnet coil 330 is energized above or more strongly than the magnet coil 331, the armature 325 is shifted toward the left. As a result, the valve opening between cavity 308 and duct 306b reduces its flow area, and the valve between cavity 308 and duct 306c increases its flow area. As a result, the pressure in cylinder 288a above piston 286a (Fig. 9) increases sufficiently to move the piston assembly downward in opposition to the force of spring 292. Consequently, the lever 280a is now tilted clockwise about the pivot pin 281a which remains stationary. When the magnet coil 331 is energized alone or more strongly than coil 330, the armature 325 moves toward the right and the pressure in the pressure space of cylinder 287a is increased, while the pressure in the pressure space of cylinder 288a is reduced. Consequently, the pivot pin 282a moves upward into the illustrated position and remains in that position while the pivot pin 281a moves also upward and turns the lever 280a clockwise about the pin 282a.

It will be recognized from the circuit diagram of Fig. 10 that apparatus according to Fig. 9 may be considered to have two individually operative control devices. The control of each device is effected by the valve displacement in only one of the two cavities 308 and 309.

It will be understood from the foregoing that in this specification the terms "cavity," "chamber" and "space" are used merely for the purpose of distinction and convenient terminology, rather than for indicating differences in size or structure. Similarly, the terms "duct," "conduit" and "passage" are not intended to denote necessary differences in design; that is, these ducts and conduits and passages may either be formed by bores or other enclosed channels or they may consist of separate pipe connections.

It will be understood by those skilled in the art, after a study of the present disclosure, that apparatus in accordance with the principles of our invention can be modified in various respects and may be realized by structural embodiments other than those specifically illustrated and described, without departing from the essence of the invention and within the essential features of the invention set forth in the claims annexed hereto.

We claim as our invention:

1. Hydraulic apparatus, comprising a hydraulic power device having a pair of ducts for circulating liquid, a hydraulic device to be controlled having another pair of ducts, a control device having a housing with two cavities individually connected between the respective ducts of one of said pairs to form two hydraulically parallelly arranged paths for the liquid, said two cavities being in communication with said respective ducts of said other pair, two movable valve means having continuously variable openings respectively and being disposed in said housing for controlling the flow of liquid through said respective paths, said valve openings being both open under all normal operating conditions of said respective valves and having normally a flow area of medium magnitude and means interconnecting said respective valve means for controling them in inverse relation to each other to increase the flow area of one valve opening while correspondingly decreasing the flow area of the other valve opening.

2. Hydraulic apparatus, comprising liquid circulating power means having a pair of ducts, a hydraulic device to be controlled having a pair of ducts, a control device having two cavities each having three openings, which are always open during the control operation of said device and of which two are flow-restricting as compared with the third, said two flow-restricting openings of each cavity being in communication with the respective ducts of one of said pairs and the third opening being in communication with one of the respective ducts of said other pair of ducts, valve means adjacent one of said flow-restricting openings of each cavity and normally positioned relative to said opening for a flow resistance of medium magnitude, said valve means in each cavity being movable for varying flow resistance between finite magnitudes, and means interconnecting said respective valve means for simultaneously controlling them in inverse relation to each other so as to increase the flow of liquid through one cavity when decreasing the flow through the other cavity.

3. Hydraulic apparatus, comprising a positive displacement pump for liquid under pressure having an inlet conduit and an outlet conduit, a hydraulic device to be controlled having a pair of ducts, a control device having two cavities each having three openings which are always open during the normal control operation of said device and of which two are flow-restricting as compared with the third, said two flow-restricting openings of each cavity being in communication with said respective conduits and the third opening being in communication with one of the respective ducts of said other pair of ducts, movable valve means adjacent one of said flow-restricting openings of each cavity for varying the effective flow resistance of said opening, and rigid means firmly interconnecting said respective valve means for simultaneously controlling them in relation to each other so as to increase the flow of liquid through one cavity when decreasing the flow through the other cavity.

4. Hydraulic apparatus, comprising a source of hydraulic pressure having an inlet conduit and an outlet conduit, a hydraulic device to be controlled having two pressure spaces and a member movable in response to differential pressure of said spaces; a control device having two cavities connected in hydraulic parallel relation to each other between said two conduits and being individually in communication with said respective pressure spaces, two valves disposed in each cavity for controlling communication between said cavity and said two respective conduits, said valves being always open during normal control operations of said device and having variable flow areas respectively, and means rigidly interconnecting said four valves for controlling them in a fixed relation to one another so that an increase in flow area of one is accompanied by a decrease in flow area of the other valve in the same cavity and by decreased flow area and increased flow area respectively of the corresponding two valves in the other cavity.

5. Hydraulic apparatus, comprising a source of hydraulic pressure having an inlet conduit and an outlet conduit of which one is split into two branches; a hydraulic motor having two motor conduits and a movable member controllable in response to the difference in pressures in said respective motor conduits; a control device having two cavities in communication with said respective motor conduits and connecting said respective conduit branches with said other source conduit, and four always open regulating valves disposed between said two cavities and said two conduit branches respectively and between said respective cavities and said other conduit, each of said valves having a flow resistance variable between high and low finite values respectively, said four valves being rigidly interconnected so that increased resistance of one valve is accompanied with decreased resistance of the other valve in the same cavity and decreased resistance and increased resistance respectively of the corresponding two valves in the other cavity.

6. Hydraulic apparatus, comprising a source of hydraulic pressure having an outlet conduit for providing liquid under pressure and a return conduit for the liquid; a pressure responsive hydraulic device having a cylinder and two pistons forming together with said cylinder a neutral space between said pistons and two pressure spaces on the respective other sides of said pistons, said neutral space being in communication with said return conduit and containing a movable member engaged by said pistons to be moved by said pistons in response to the difference in pressures in said respective pressure spaces; a control device having two cavities individually disposed between said outlet conduit and said inlet conduit to form two hydraulically parallelly arranged paths between said two conduits, said cavities being in communication with said two pressure spaces, two always-open valves of gradually variable flow-resistance disposed in each cavity to control the communication between said cavity and said two respective conduits, and means rigidly connecting said four valves with one another so that increased resistance of one valve is accompanied by decreased resistance of the other valve in the same cavity and decreased resistance and increased resistance respectively of the two corresponding two valves in the other cavity.

7. Hydraulic apparatus, comprising a source of hydraulic pressure having an inlet conduit and an outlet conduit of which one is split into the branch conduits; a control device having two cavities communicating with said respective pressure spaces, each cavity having two aligned conical openings in communication with said two respective conduits, a body disposed in each cavity between said openings and movable in the alignment axis of said openings, said body having two conical valve faces adjacent to but always spaced from said respective openings so that movement of said body in one direction increases the flow resistance at one opening and decreases the flow resistance at the other opening, and rigid structure firmly connecting said two bodies with each other for controlling them to move simultaneously so that a variation of the flow resistance at the openings of one cavity is accompanied by inverse variation of the flow resistances at the corresponding respective openings in the other cavity.

8. Hydraulic apparatus, comprising a single hydraulic pressure source having two ducts for circulating liquid under pressure; a hydraulic device to be controlled having two relatively movable members and spring means biasing said members in one direction relative to each other, said members forming together a liquid-receiving space to move in the other direction when the pressure in said space exceeds the force of said biasing means; a control device having a cavity in free communication with said space, said cavity having two valve-controlled openings in always open communication with said respective ducts, two movable valve members disposed in cooperative relation to said respective openings and connected with each other for varying the effective flow areas of said respective valve openings in inverse relation to each other through a range above a finite minimum magnitude.

9. Hydraulic apparatus, comprising a single hydraulic pressure source having two ducts for circulating liquid under pressure; a hydraulic device to be controlled having a cylinder and a piston forming together two enclosed spaces for liquid on both sides respectively of said piston and being movable relative to each other in dependence upon the difference of the pressures in said respective spaces, one of said spaces being in always open communication with only one of said ducts; a control device having a cavity with three openings of which one is in always open communication with said other space, the two other openings being in always open communication with said respective ducts, two movable valve members disposed adjacent said two other openings for varying the effective flow areas of said other openings respectively, and control means connected with said two valve members for moving them together to vary said areas in inverse relation to each other.

10. Hydraulic apparatus, comprising a hydraulic pressure source having a pressure duct and a return duct for circulating liquid under pressure; a device to be controlled having a cylinder and a piston forming together two enclosed spaces for liquid on both sides respectively of said piston and being movable relative to each other in dependence upon the difference of the pressures in said respective spaces, one of said spaces being in free communication with said return duct; a control device having a cavity with three openings of which two are in always open communication with said respective ducts while the third opening is in always open communication with said other space, a valve body movably disposed in said cavity and having two valve elements adjacent said two openings respectively so that movement of said body varies the effective flow areas of said two openings in inverse relation to each other, and condition-responsive control means connected to said body for controlling said body.

11. Hydraulic control apparatus, comprising a housing having first duct means open toward the exterior for supplying liquid under pressure, second duct means open to the exterior for the discharge of liquid, two outlet ducts open to the exterior for providing respective hydraulic pressures of controllable differential value, two cavities within said housing, each cavity having three openings communicating with said first duct means and said second duct means and an individual one of said outlet ducts respectively, a valve structure disposed in each cavity and having two valve elements adjacent the two respective openings that communicate with said first and second duct means, said valve elements being always spaced from said respective two openings during normal operation of the apparatus and being positioned relative to said two respective openings to normally maintain respective flow resistances of medium magnitude at said two openings, and said valve structures being movable for varying said flow resistances between finite magnitudes in inverse relation to each other, and connecting means joining said two valve structures so that movemet of one structure toward reduced flow resistance of one opening in one cavity is accompanied by movement of the other structure toward increased flow resistance of the corresponding opening in the other cavity.

12. Hydraulic control apparatus, comprising a housing having pressure duct means open toward the exterior for supplying liquid under pressure, a neutral duct open to the exterior for the discharge of liquid, two outlet ducts open to the exterior for providing respective hydraulic pressures of controllable differential value, a neutral chamber in communication with said neutral duct, two cavities in communication with said respective outlet ducts, each of said cavities having two aligned openings in communication with said pressure duct means and said neutral chamber respectively, a valve body disposed in each cavity and movable in the alignment axis of said two openings, each valve body having two valve elements adjacent said respective two openings so that movement of said body varies the flow areas of said openings in inverse relation to each other, said valve elements being spaced from said respective openings in all operating positions of said valve body, and said valve body having normally a given position in which said flow areas have a medium magnitude, structure rigidly interconnecting said two bodies and traversing the two openings that communicate with said neutral duct, and condition-responsive control means disposed in said neutral chamber and connected to said structure for controlling said bodies to move in a fixed relation to each other so that increase in area of one of said latter two openings is accompanied by decrease in area of the other opening.

13. Hydraulic control apparatus, comprising a housing having pressure duct means open toward the exterior for supplying liquid under pressure, a neutral duct open to the exterior for the discharge of liquid, two outlet ducts open to the exterior for providing respective hydraulic pressures of controllable differential value, a neutral chamber in communication with said neutral duct, an intermediate pressure chamber having a bleeder passage communicating with said neutral chamber, two cavities in communication with said respective outlet ducts, each of said cavities having two valve openings in communication with said pressure duct means and said intermediate chamber respectively, two interconnected valve elements disposed in each cavity and being together movable relative to said two valve openings for varying the flow resistance values of said two valve openings in inverse relation to each other, connecting structure joining the valve elements in one cavity with those in the other cavity and extending through said intermediate pressure chamber, a variable-volume container disposed in said intermediate pressure chamber and connected with said structure for controlling said valve elements, said container being hydraulically associated with said bleeder passage to be actuated in dependence upon the pressure in said passage, and condition-responsive control means disposed in said neutral chamber and having pilot valve means for controlling said passage to vary the pressure therein.

14. Hydraulic control apparatus for vehicle stabilizers, comprising a housing having pressure duct means open toward the exterior for supplying liquid under pressure, a neutral duct open to the exterior for the discharge of liquid, two outlet ducts open to the exterior and adjusted for attachment to stabilizing equipment to provide therefor respective hydraulic pressures of controllable differential value, a neutral chamber in communication with said neutral duct, an intermediate pressure chamber having bleeder passages communicating with said neutral chamber, two cavities in communication with said respective outlet ducts, each of said cavities having two valve openings in communication with said pressure duct means and said intermediate chamber respectively, two interconnected valve elements disposed in each cavity and being together movable relative to said two valve openings for varying the flow resistance values of said two valve openings in inverse relation to each other, connecting structure joining the valve elements in one cavity with those in the other cavity and extending through said intermediate pressure chamber, actuating means disposed in said intermediate pressure chamber and connected with said structure for moving the latter, control means connected with said actuating means for controlling the latter and including an inertia mass movably disposed in said neutral chamber, and hydraulic means disposed for biasing the movement of said mass in order to obtain a desired performance characteristic and having a variable volume container in mechanical connection with said mass and in hydraulic connection with one of said bleeder passages so as to be subjected to pressure dependent upon the pressure difference between said intermediate pressure chamber and said neutral chamber.

15. Hydraulic control apparatus, comprising a housing having pressure duct means open toward the exterior for supplying liquid under pressure, a neutral duct open to the exterior for the discharge of liquid, two outlet ducts open to the exterior for providing respective hydraulic pressures of controllable differential value, a neutral chamber in communication with said neutral duct, two cavities in communication with said respective outlet ducts each of said cavities having two aligned openings in communication with said pressure duct means and said neutral chamber respectively, a valve body disposed in each cavity and movable in the alignment axis of said two openings, each valve body having two valve elements adjacent said respective two openings so that movement of said body varies the flow areas of said openings in inverse relation to each other, said valve elements being spaced from said respective openings in all operating positions of said valve body, and said valve body having normally a given position in which said flow areas have a medium magnitude, a rigid structure extending through said neutral chamber and rigidly interconnecting said two bodies for moving them in a fixed relation to each other so that increase in flow area of an opening in one cavity is accompanied by decrease in flow area of the corresponding opening in the other cavity, and an electromagnet disposed in said neutral chamber and having an armature mounted on said structure for controlling said valve bodies.

16. Vehicle stabilizing apparatus, comprising a device having two relatively movable members defusing together two pressure spaces to control relative movement between said members in response to the differential value of the pressures in said respective spaces; a positive displacement pump for liquid having a pressure conduit and a return conduit; a control device having a neutral chamber in communication with said return conduit and two cavities in communication with said two respective pressure spaces, each cavity having two valve openings communicating with said pressure conduit and said return conduit respectively, a valve body disposed in each cavity and having two valve elements to cooperate with said respective two openings so that movement of said body varies the flow areas of said respective openings in inverse relation to each other, said valve elements being spaced from said respective openings in all operating positions of said valve body, and said valve body having normally a given position in which said flow areas have a medium magnitude, said two valve bodies being interconnected for simultaneous operation so that increase in flow area of one opening is accompanied by decrease in flow area of the corresponding opening in the other cavity, and an inertia mass movably suspended in said neutral chamber and connected with said structure for controlling it in response to movement to be stabilized to cause said device to produce relative movement of said members in the stabilizing direction.

LAWRENCE B. LYNN.
STANLEY J. MIKINA.

REFERENCES CITED

The following references are of record in the file of this patent:

UNITED STATES PATENTS

| Number | Name | Date |
|---|---|---|
| 955,852 | Coyle | Apr. 26, 1910 |
| 1,454,396 | MacDonald | May 8, 1923 |
| 1,992,048 | Temple | Feb. 19, 1935 |
| 2,229,530 | South | Jan. 21, 1941 |
| 2,378,497 | Phillips | June 19, 1945 |